(12) United States Patent
Chaudhry et al.

(10) Patent No.: US 8,898,436 B2
(45) Date of Patent: Nov. 25, 2014

(54) METHOD AND STRUCTURE FOR SOLVING THE EVIL-TWIN PROBLEM

(75) Inventors: Shailender Chaudhry, San Francisco, CA (US); Marc Tremblay, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 316 days.

(21) Appl. No.: 12/426,550

(22) Filed: Apr. 20, 2009

(65) Prior Publication Data

US 2010/0268919 A1 Oct. 21, 2010

(51) Int. Cl.
*G06F 9/30* (2006.01)
*G06F 9/38* (2006.01)

(52) U.S. Cl.
CPC ............ *G06F 9/30098* (2013.01); *G06F 9/384* (2013.01); *G06F 9/30112* (2013.01); *G06F 9/3838* (2013.01); *G06F 9/30138* (2013.01)
USPC ........................................................ 712/209

(58) Field of Classification Search
None
See application file for complete search history.

(56) References Cited

U.S. PATENT DOCUMENTS

| 5,790,827 A | 8/1998 | Leung |
| 5,897,665 A * | 4/1999 | Padwekar ..................... 711/212 |
| 6,499,123 B1 | 12/2002 | McFarland et al. |
| 7,340,590 B1 | 3/2008 | Sugumar et al. |
| 2001/0044891 A1 | 11/2001 | McGrath et al. |

FOREIGN PATENT DOCUMENTS

| EP | 0 640 912 | 3/1995 |
| WO | WO 2008/016902 | 2/2008 |

OTHER PUBLICATIONS

International Bureau of WIPO, International Preliminary Report on Patentability for PCT International Patent Application PCT/US2010/001099, Nov. 3, 2011, 9 pages.

* cited by examiner

*Primary Examiner* — William B Partridge
(74) *Attorney, Agent, or Firm* — Meyer IP Law Group (57) ABSTRACT

A register file, in a processor, includes a first plurality of registers of a first size, n-bits. A decoder uses a mapping that divides the register file into a second plurality M of registers having a second size. Each of the registers having the second size is assigned a different name in a continuous name space. Each register of the second size includes a plurality N of registers of the first size, n-bits. Each register in the plurality N of registers is assigned the same name as the register of the second size that includes that plurality. State information is maintained in the register file for each n-bit register. The dependence of an instruction on other instructions is detected through the continuous name space. The state information allows the processor to determine when the information in any portion, or all, of a register is valid.

20 Claims, 5 Drawing Sheets

FIG. 5

METHOD AND STRUCTURE FOR SOLVING THE EVIL-TWIN PROBLEM

BACKGROUND OF THE INVENTION

1. Field of the Invention

The present invention relates generally to register files of microprocessors, and more particularly to register files that support multiple register sizes simultaneously.

2. Description of Related Art

As processors have become more powerful, the size of a data unit processed by such processors has continually increased. For example, some of the earlier processors included register files where each register entry stored a byte of data. The register size in register files in some processors is sixty-four bits for each register.

Figure 1A:
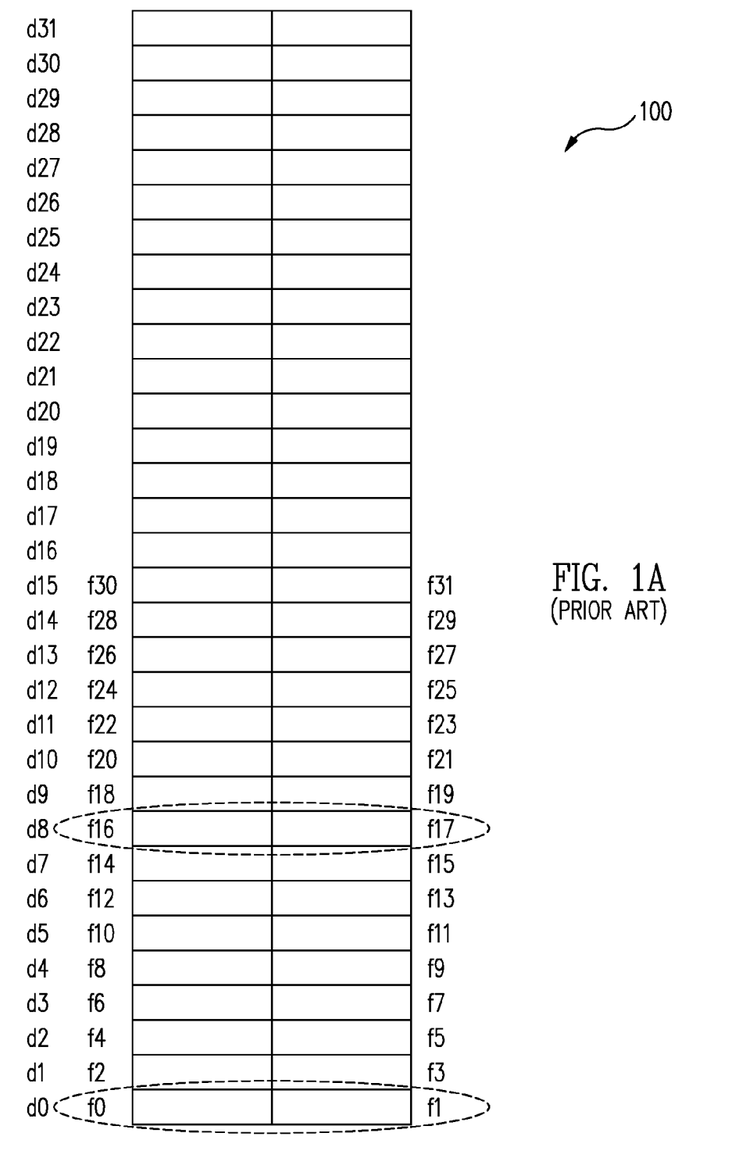
FIGS. 1A and 1B is a block diagram of a mapping of a prior art register file.

Typically, when a new processor is introduced, the processor is configured to process computer code that was written for earlier processors with smaller register sizes as well as computer code written for the largest register size available in the new processor, i.e., backward compatibility for computer programs is maintained in the new processor. FIG. 1A is an example of a register file 100 in which the size of a register has doubled from one generation of a processor to the next generation of that processor. For example, the older processor utilized thirty-two thirty-two bit registers, f0 to f31. The new processor utilizes thirty-two sixty-four bit registers d0 to d31.

As shown in FIG. 1A, the least significant thirty-two bits of register d0 is register f0 and the most significant thirty-two bits of register d0 is register f1. Thus, register d0 includes register f0 and register f1. Herein, register f1 is referred to as the twin of register f0. Each of registers d0 to d15 includes two thirty-two bit registers and so each of registers d0 to d15 includes twin registers.

The thirty-two bit register in the most significant bits of the sixty-four bit register is referred to as the evil twin of the thirty-two bit register in the least significant bits of that sixty-four bit register. Use of register file 100 for executing instructions that use both thirty-two bit and sixty-four bit registers can lead to a problem, which is referred to as the "evil-twin" problem.

If two instructions are coupled through a thirty-two bit register in the most significant bits for a sixty-four bit register, i.e., coupled by the evil-twin register, the processor normally does not detect the coupling. Thus, incorrect results may be obtained as a result of the evil-twin problem.

Figure 1B:
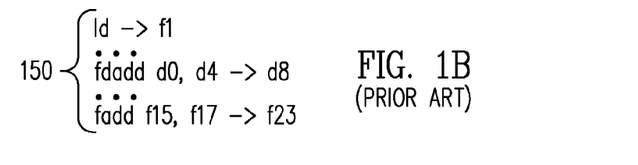

As an example, the comparators for instructions using sixty-four bit operands do not detect an instruction using the thirty-two-most significant bits of the sixty-four bit register as a destination. FIG. 1B is a segment of a computer program 150 that includes instructions that are coupled but the coupling is not detected by the comparators and so computer program 150 suffers from the evil-twin problem.

In FIG. 1B, load instruction ld loads a value in register f1, which is the thirty-two most significant bits of register d0 and is the evil-twin register. Floating pointing double precision add instruction fdadd, in the next line, adds the value in register d0 to the value in register d4 and places the resulting value in register d8. Register d0 is a sixty-four bit register and so includes any value in register f1, as indicated in FIG. 1A.

However, the comparators, which are used in determining instructions on which floating point double precision add instruction fdadd depends, do not detect the dependence of floating point double precision add instruction fdadd on the result of load instruction ld in evil-twin register f1. Thus, the floating point double precision add instruction fdadd could be performed before load instruction ld completed. In this case, the accuracy of the result of the floating point double precision add instruction fdadd is unknown, and is most likely incorrect because the result of instruction ld is not in evil-twin register f1.

Similarly, sixty-four bit register d8 includes thirty-two bit register f17, also as shown in FIG. 1A. Floating point add instruction fadd adds the value in register f15 to the value in evil-twin register f17 and places the resulting value in register f23. However, register f17 does not include the correct value until after floating point double precision add instruction fdadd completes.

The dependence of floating point add instruction fadd on the result of floating point double precision add instruction fdadd is not detected by the comparators. Thus, floating point add instruction fadd could be performed before floating point double precision add instruction fdadd completed. In this case, the accuracy of the result of floating point add instruction fadd is unknown, and is most likely incorrect because the result of instruction fdadd is not in evil-twin register f17.

In each of these instances, the problem is the inability of the processor to detect the dependence of an instruction on a value in an evil-twin register. As noted, this problem is referred to as the evil-twin problem.

In this example, each of registers f1, f3, . . . is the referred to as the evil twin of registers f0, f2, respectively. This evil-twin problem has been accepted because the mapping of the different sized registers to the same register file minimizes the area required by the register file while permitting execution of different generations of computer code on a processor. Moreover, to avoid the evil-twin problem, some processors, for example, prohibit launching a double precision instruction until all single precision instructions have completed, and conversely. The delay in launching stalls the pipeline until execution is completed for the one set of instructions.

SUMMARY OF THE INVENTION

In one embodiment, a processor eliminates the evil twin problem. The solution to the evil twin problem (i) minimizes the area on the chip required to support the solution; (ii) can be implemented in a content addressable memory with a single port; and (iii) does not require stalling the pipeline. Thus, in contrast to the prior art, instructions in a computer program having different size operands and different size results can be intermingled. The intermingled instructions are executed properly without the prior art special precautions to avoid the evil-twin problem.

In one embodiment, the evil twin problem is solved in a processor supporting (i) a first instruction set having first instructions with sources and destinations of a first size, n-bits, where n is an integer, and (ii) a second instruction set having second instructions having sources and destinations of a second size m-bits, where m is an integer. The second size, m-bits, is an even integer multiple of the first size n-bits. A register file in the processor in includes a first plurality of registers of the first size.

A decoder uses a mapping that divides the register file into a second plurality M of registers having the second size. The second size is the largest size register used to store data in the register file. In the mapping, each of the registers having the second size, m-bits, is assigned a different name in a continuous name space.

Each register of the second size includes a third plurality N of registers of the first size, n-bits, where N is an even integer. As indicated above, integer m is an even multiple N of integer n. The first size is the smallest size register used to store data in the register file. The mapping assigns each register in the third plurality N of registers the same name as the register of the second size that includes that plurality.

Thus, the register file is mapped into (M*N) n-bit registers so that the first plurality is (M*N) registers. State information is maintained in the register file for each n-bit register. In one embodiment, the state information is provided by a valid bit.

There can be a set of intermediate size registers that are larger than the first size but smaller than the second size, the intermediate size registers also are mapped to the same name as the name of the m-bit register containing the intermediate size registers. A larger intermediate sized register also is an even integer multiple of the smallest sized register. When a particular register is written to, all the valid bits associated with that register size are asserted.

Since a register of the second size and all registers of the first size included in that register have a common name, register dependencies between instructions that utilize different sized registers is easily ascertained. Also, since state information is maintained in the register file for each register of the first size, the processor can determine when an instruction, which utilizes all or part of a register of the second size, is ready and so can issue the instruction for execution at an appropriate time without stalling the pipeline. The unique mapping in combination with the state information eliminates the evil-twin problem for the processor.

In one embodiment, a processor includes a register file comprising a plurality of registers of a first size and a decode unit. The decode unit decodes instructions from a first instruction set having sources and destinations of the first size, and instructions from a second instruction set having sources and destinations of a second size. The second size is a multiple n of the first size where n is an even integer.

The decode unit also includes a mapping unit for mapping register names for instructions in the first instruction set and register names for instructions in the second instruction set into a common name space. A register name in the common name space is a same name (i) for each register in a set of n registers in the plurality of registers and (ii) for a register of the second size including the set of n registers. The common name space is a continuous name space for the register file. Each register of the first size has a corresponding valid bit to provide state information for that register.

The processor also includes a scoreboard having an entry for each register of the first size, and an execution pipe coupled to the register file. Upon the execution pipe writing a result to only one register in a set of n registers, a valid bit is asserted only for the one register. Upon the execution pipe writing a result to all registers in a set of n registers, a valid bit for each of the n registers is asserted.

The register file is included in a content addressable memory with only a single port. The register file can be, for example, a working register file, an architectural register file, or both.

A method for solving an evil twin problem in a processor, supporting a first instruction set having first instructions with sources and destinations of a first size, and a second instruction set having second instructions having sources and destinations of a second size, includes decoding, by a decoding pipe of the processor, the first instructions and the second instructions. The second size is a multiple n of the first size where n is an even integer.

The decoding further includes mapping register names for the first instructions and register names for the second instructions into a common name space for a register file comprising a plurality of registers of the first size. A register name in the common name space is a same name (i) for each register in a set of n registers in the plurality of registers and (ii) for a register of the second size including the set of n registers. The common name space is a continuous name space for the register file. The method also includes maintaining, in the register file, separate state information for each register of the first size in the register file.

BRIEF DESCRIPTION OF THE DRAWINGS

In the drawings, elements with the same reference numeral are the same or equivalent elements. Also, the first digit of a reference numeral is the figure number of the figure in which that element first appears.

DETAILED DESCRIPTION

Figure 2:
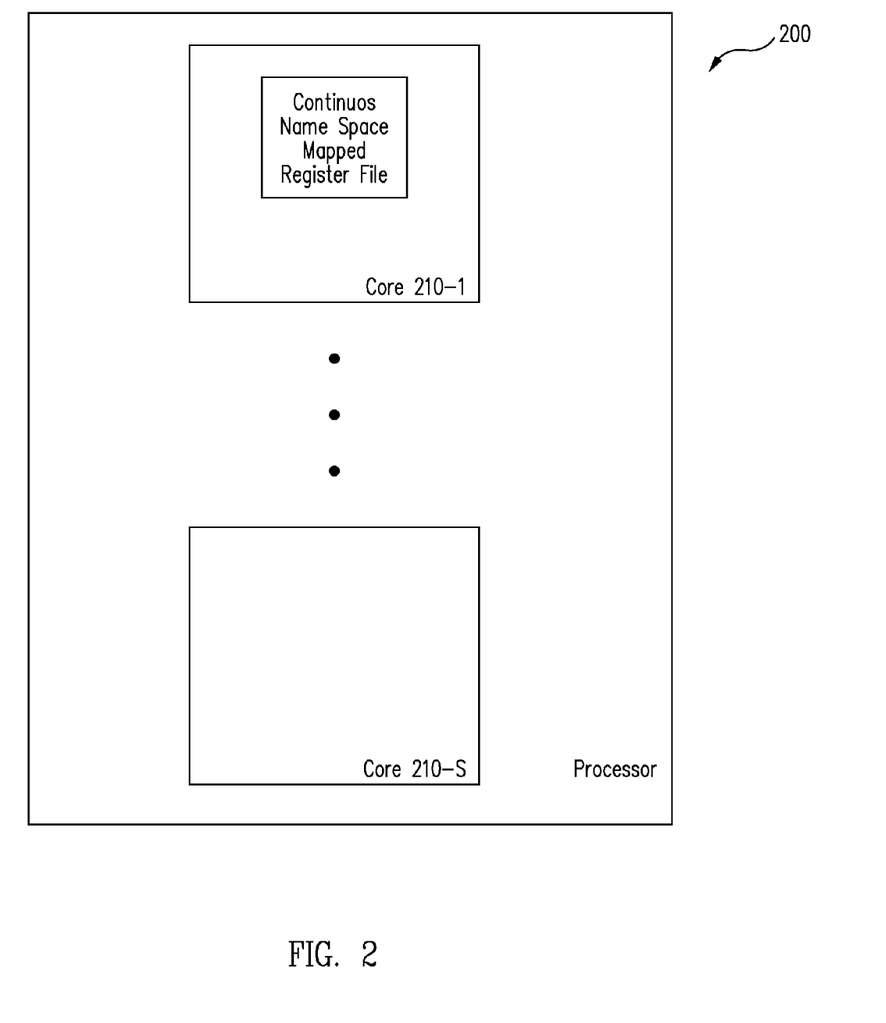
FIG. 2 is a high level block diagram of a processor including a plurality of cores in which at least one core includes a continuous name space mapped register file according to one embodiment of this invention.

According to one embodiment of this invention, a processor 200 includes a plurality of cores 210-$i$, where i ranges from 1 to S, where S is an integer. The plurality of cores 210-$i$ may have a common registers file or each core 210-$i$ may have its own register files, or some combination of global and local register files. Irrespective of the particular configuration of the register files in processor 200, a novel mapping of registers in a register file into a continuous name space allows the evil twin problem to be recognized and to be solved.

The solution of utilizing a continuous name space for the register file allows sharing of a CAM (Content-Addressable Memory) port when the register file is implemented in a CAM and so does not require an additional CAM port. Thus, the amount of space on the die required to implement the solution to the evil twin problem is limited to the space required to implement the mapping in the decoder and a small amount of additional space in the CAM for additional valid bits, as described more completely below. Also, unlike the prior art, the solution does not requiring stalling the pipeline until an instruction or instructions using a particular size of register have completed execution.

Before considering the solution to the evil twin problem in further detail, normal operation of a pipeline 310 (FIG. 3) in a core 210-$i$ is considered.

Figure 3:
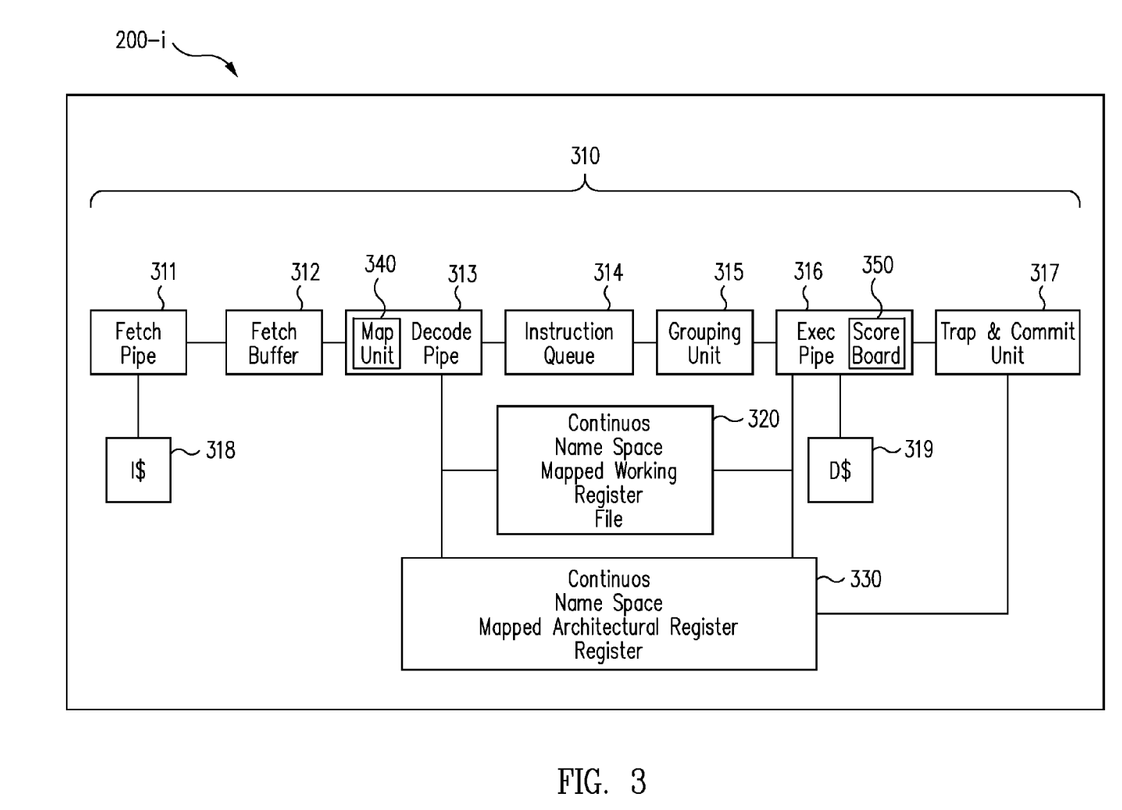
FIG. 3 is a more detailed block diagram of a representative core of the processor of FIG. 2 according to one embodiment of the invention.

Pipeline 310 executes instructions and writes the results to a working register file 320. When an instruction is retired, the result for that instruction in working register file 320 is written to an architectural register file 330.

As illustrated in FIG. 3A, pipeline 310 also includes a fetch pipe 311 having one or more stages. Fetch pipe 311 is coupled to an instruction store 318, e.g., a level two (L2) cache memory. An output of fetch pipe 311 is provided to a fetch buffer 312. In at least one embodiment, fetch buffer 312 is configured to service multiple threads.

Decode pipe 313 includes one or more stages that function to decode instructions. The instructions can include at least instructions from two different instructions sets. Instructions in a first instruction set utilize registers, as sources and destinations, of a first size. Instructions in a second instruction set utilize registers, as sources and destinations, of a second size. The registers used for storing inputs to an instruction, i.e., operands, are referred to as sources, while the registers used for storing the results of the executed instructions are referred to as destinations. The second size is different from the first size. The second size is a multiple n of the first size where n is an even integer.

As explained more completely below, one stage of decode pipe 313 includes a map unit 340, which maps the names of registers in register file 320 into a continuous name space to eliminate the evil twin problem associated with the at least two different register sizes. Architectural register file 330 is mapped in a similar way. Decode pipe 313 is coupled to an instruction queue 314, which serves to decouple decode pipe 313 from later stages of pipeline 310.

In this example, working register file (WRF) 320 and architectural register file (ARF) 330 are coupled to decode pipe 313, an execution pipe 316, and a trap and commit unit 317.

Instructions stored in instruction queue 314 are grouped, by grouping unit 315, for execution by execution pipe 316. Execution pipe 316 is coupled to trap and commit unit 317, which commits executed instructions to architectural state in architectural register file 330. A data cache 319 is coupled to execution pipe 316. Data cache 319 provides data to execution pipe 316.

Hence, in this example, register files 320 and 330 support at least two register sizes where one size is an even multiple of the other size. Decode pipe 313 decodes at least computer programs including instructions from the first instruction set and instructions from the second instruction set.

In the following example, the first size is taken as thirty-two bits and even integer n is taken as two. Thus, the second size is sixty-four bits. The use of these sizes is illustrative only and is not intended to limit the invention to this specific example. In view of the disclosure, those knowledgeable in the field can extend the application, for example, to four sets of instructions with sources and destinations that are even integer multiples of each other, e.g., instructions with eight bit sources and destinations; instructions with sixteen bit sources and destinations; instructions with thirty-two bit sources and destinations; and instructions with sixty-four bit sources and destinations. Alternatively, instructions with thirty-two bit sources and destinations; instructions with sixty-four bit sources and destinations; and instructions with one-hundred-twenty-eight bit sources and destinations could be utilized.

Figure 4A:
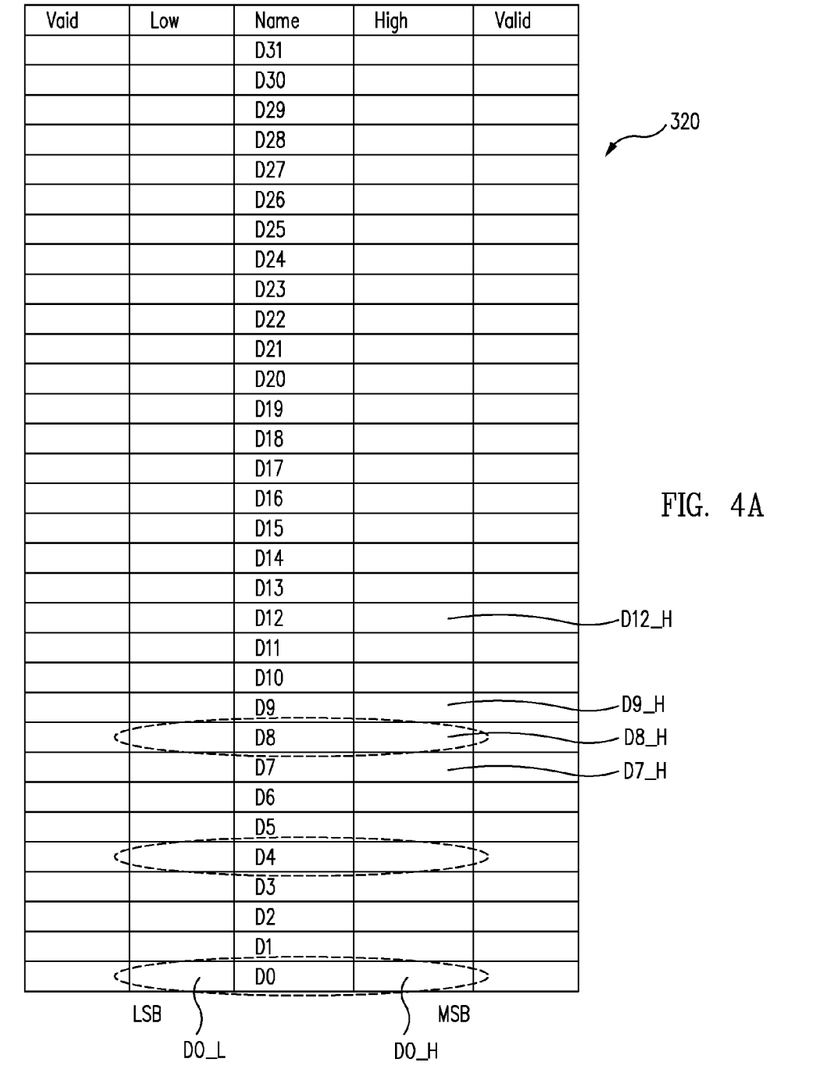
FIGS. 4A and 4B is an illustration of the novel mapping of a register file according to one embodiment of the invention.

FIG. 4A is an example illustrating the mapping of working register file 320 by map unit 340 into a continuous name space. Working register file 320 includes thirty-two sixty-four bit registers, in this example.

Register file 320 is mapped into sixty-four thirty-two bit registers, i.e., a plurality of registers of the first size. A scoreboard 350, associated with execution pipe 316, maintains status information for each of the sixty-four thirty-two bit registers.

To allow the use of a single CAM port for working register file 320, each pair of thirty-two registers and the sixty-four bit register including that pair share a common name. One register in the pair is the low register for the name and the other register in the pair is the high register for that name. In the example of FIG. 4A, the names range from D0 to D31 and the lower register is represented by "Low," while the upper register is represented by "High." The names D0 to D31, High, Low, and Valid in FIG. 4A are reference numerals; are used for ease of understanding; and should not be interpreted as requiring the names to be stored in working register file 320.

Also, herein to differentiate between the high and low portions of a register Di, where i ranges from 0 to 31, a reference numeral of Di_H is used for the high portion of register Di; a reference numeral Di_L is used for the low portion of register Di; and reference numeral Di includes both registers Di_L and Di_H. In this implementation, register Di includes a set of twins, registers Di_H and Di_L, and all three registers are represented by a common register name Di. A separate signal is used to indicate the high and low portions respectively of register Di. Also, each portion of a register Di has a valid bit, which is used as described more completely below.

Figure 4B:
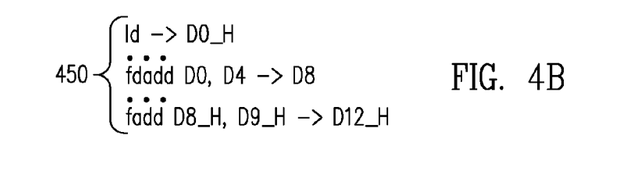

Consider code segment 150 in FIG. 1B and the results obtained by map unit 340 for mapping the registers in code segment 150 to working register file 320 in FIG. 4A. Register f1 is mapped to the high portion of register D0 and is represented by reference numeral D0_H. Registers d0, d4, and d8 are mapped to registers D0, D4, and D8 respectively. Register f15 is mapped to the high portion of register D7 and is represented by reference numeral D7_H; register f17 is mapped to the high portion of register D8 and is represented by reference numeral D8_H; and register f23 is mapped to the high portion of register D12 and is represented by reference numeral D12_H. The instructions after the mapping are shown in FIG. 4B as code segment 450.

Since the comparators compare the register names, i.e., D0 to D31, the comparators detect the dependency of the various instructions. Thus, instruction fdadd is not executed until instruction ld completes, and instruction fadd is not executed until instruction fdadd completes. The mapping to a continuous name space permits detection of the evil twin problem and a solution by preventing execution until the proper data becomes available.

Specifically, when a value is loaded to register D0_H, the valid bit for register D0_H is asserted and value of the valid bit for register D0_L is unchanged. Similarly; when a value is loaded or written to register D0_L, the valid bit for that register is asserted and the valid bit for register D0_H is unchanged. If a value is loaded or written to a register Di, where i ranges from 0 to 31, both the upper and lower valid bits are asserted. A valid bit is de-asserted when the destination register becomes available for bypass, either from an intermediate register or from the register file itself.

Thus, not only can the floating point double precision add instruction fdadd detect the dependence of the instruction on the value in register D0_H based on the common name, but also when the valid bit for register D0_H is read, the instruction can determine whether the read value is valid. Similarly, if an instruction needs a value in register Di, the value in register Di is not valid until both valid bits are asserted. Thus, the dependence of an instruction is not only detected through the continuous name space, but also the valid bits allow the processor to determine when the information in any portion, or all, of register Di is valid.

Since a register of the second size and all registers of the first size included in that register have a common name, dependencies between instructions that utilize different sized registers is easily ascertained as illustrated above. Also, since state information is maintained in the register file for each register of the first size, the processor can determine when an instruction that utilizes all or part of a register of the second size is ready and so can issue the instruction for execution at an appropriate time without stalling the pipeline. The unique mapping in combination with the state information eliminates the evil-twin problem for the processor.

The mapping to a continuous name space in conjunction with the use of the valid bits is different from register renaming in an out-of-order processor. In register renaming, the registers are assigned names based on program order and typically are not continuous and so register renaming requires double the number of CAM ports.

In more general terms, the mapping in the decoder divides a register file into a second plurality of registers M having a second size, where the second size is a second number m of bits. The second size is the largest size register used to store data in the register file. Each of the registers having the second size, m-bits, is assigned a different name in a continuous name space. The register file includes a first plurality of registers of a first size, as defined below.

Each register of the second size includes a third plurality N of registers of the first size, where the first size is a first number n of bits and integer m is an even multiple N of integer n. The first size is the smallest size register used to store data in the register file. Each register in the third plurality of registers has the same name as the register of the second size that includes that plurality.

Thus, the register file is mapped into (M*N) n-bit registers. State information is maintained for each n-bit register. There can be intermediate size registers that are larger than the first size but smaller than the second size. A larger intermediate sized register also is an even integer multiple of the smallest sized register. When a particular register is written to, all the valid bits associated with that register size are asserted.

Figure 5:
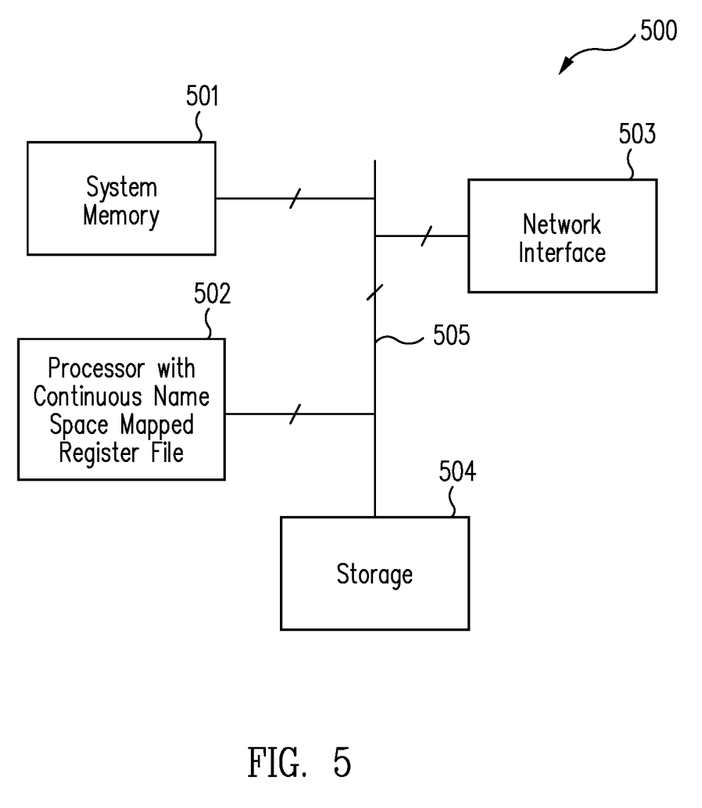
FIG. 5 is block diagram of a system that includes a processor that includes and utilizes a continuous name space mapped register file according to an embodiment of this invention.

FIG. 5 depicts an example of a computer system 500 constructed according to various aspects of the present invention. Computer system 500 includes a processor 502 with at least one continuous name space mapped register file. Processor 502 may include multiple cores, be a single threaded processor, be a multi-threaded processor, etc. In one embodiment computer system 500 is a stand alone system, while in another embodiment computer system 500 is a server computer that is networked and is part of a client-server system.

Computer system 500 also includes system memory 501, e.g., one or more cache levels, SRAM (Static Random Access Memory), DRAM (Dynamic Random Access Memory), RDRAM (Rambus DRAM), EDO RAM (Extended Data Output Random Access Memory), DDR RAM (Double Data Rate Random Access Memory), and/or EEPROM (Electrically Erasable Programmable Read Only Memory), etc.), a system bus 505 (e.g., LDT (Lightning Data Transport), PCI (Peripheral Component Interconnect), ISA (Industry Standard Architecture), etc.), a network interface 503 (e.g., an ATM (Asynchronous Transfer Mode) interface, an Ethernet interface, a Frame Relay interface, etc.), and storage 504, e.g., optical storage, magnetic storage, etc.

Computer system realizations of the invention may include fewer or additional components not illustrated in FIG. 5. For example, computer system 500 may also include a video card, an audio card, additional network interfaces, peripheral devices, etc. Processor 502, storage 504, network interface 503 and system memory 501 are coupled to system bus 505, which includes a plurality of address, data and control lines. Processor 502 includes instruction store 318 and a memory interface that couples the instruction store 318 to a memory hierarchy, i.e., system memory 501. It should be appreciated that the computing apparatus described herein may be embodied as a design file representation including machine readable instructions encoded on one or more computer readable media.

We claim:

1. A processor comprising:
a continuous name space mapped register file comprising a plurality of registers, wherein each register in the plurality of registers is of a first size, wherein each register is associated with one of a low portion or a high portion of a register of a second size, and wherein each low portion and each high portion has a valid bit associated with that portion;
a decode unit for decoding
first instructions having sources and destinations of the first size, and
second instructions having sources and destinations of the second size,
wherein the second size is an even integer multiple n of the first size; and
a mapping unit for mapping register names for the first instructions, and register names for the second instructions, into a common name space, by
(i) for instructions having sources and destinations of the first size and a register of the first size in a named set of registers in the plurality of registers, asserting the valid bit for one of the low portion or the high portion of that named set of registers, and mapping the instruction accordingly, and
(ii) for instructions having sources and destinations of the second size and a register of the second size in the named set of registers, asserting the valid bits for both the low and high portions of that named set of registers, and mapping the instruction accordingly.

2. The processor of claim 1 wherein each register of the first size has a corresponding valid bit.

3. The processor of claim 1 further comprising:
a scoreboard having an entry for each register of the first size.

4. The processor of claim 1 further comprising:
an execution pipe coupled to the register file, wherein upon the execution pipe writing a result to only one register in a set of n registers, a valid bit is asserted only for the one register.

5. The processor of claim 1 further comprising:
an execution pipe coupled to the register file, wherein upon the execution pipe writing a result to all registers in a set of n registers, a valid bit for each of the n registers is asserted.

6. The processor of claim 4 further wherein upon the execution pipe writing a result to all registers in the set of n registers, a valid bit for each of the n registers is asserted.

7. The processor of claim 1 wherein n is two and the first size is thirty-two bits.

8. The processor of claim 1 further comprising:
a content addressable memory with only a shared port, wherein said register file is included in said content addressable memory.

9. The processor of claim 1 wherein the register file is a working register file.

10. A method for solving an evil twin problem in a processor supporting first instructions with sources and destinations of a first size, and second instructions having sources and destinations of a second size, where the second size is an even integer multiple n of the first size, the method comprising:
providing a continuous name space mapped register file comprising a plurality of registers, wherein each register in the plurality of registers is of a first size, wherein each register is associated with one of a low portion or a high portion of a register of the second size, and wherein each low portion and each high portion has a valid bit associated with that portion;
decoding, by a decoding pipe of the processor, the first instructions having sources and destinations of the first size, and the second instructions having sources and destinations of the second size, wherein the decoding further comprises mapping register names for the first instructions and register names for the second instructions into a common name space by
(i) for instructions having sources and destinations of the first size and a register of the first size in a named set of registers in the plurality of registers, asserting the valid bit for one of the low portion or the high portion of that named set of registers, and mapping the instruction accordingly, and
(ii) for instructions having sources and destinations of the second size and a register of the second size in the named set of registers, asserting the valid bits for both the low and high portions of that named set of registers, and mapping the instruction accordingly.

11. The method of claim 10 further comprising:
maintaining separate state information for each register of the first size in the register file.

12. The method of claim 10 further comprising:
maintaining an entry for each of the registers of the first size in a scoreboard.

13. The method of claim 10 further comprising:
asserting only a valid bit for one register in a set of n registers upon an execution pipe in the processor writing a result to only the one register in the set of n registers.

14. The method of claim 10 further comprising:
asserting a valid bit for each register in a set of n registers upon an execution pipe writing a result to all registers in the set of n registers.

15. The method of claim 13 further comprising:
asserting a valid bit for each register in the set of n registers upon the execution pipe writing a result to all registers in the set of n registers.

16. The method of claim 10 wherein n is two and the first size is thirty-two bits.

17. The method of claim 10 wherein the register file is included in a content addressable memory with only a shared port.

18. The method of claim 10 wherein the register file is a working register file.

19. A system comprising:
a memory; and
a processor, coupled to the memory, comprising:
a continuous name space mapped register file comprising a plurality of registers wherein each register in the plurality of registers is of a first size, wherein each register is associated with one of a low portion or a high portion of a register of a second size, and wherein each low portion and each high portion has a valid bit associated with that portion;
a decode unit for decoding
first instructions having sources and destinations of the first size, and
second instructions having sources and destinations of the second size,
wherein the second size is an even integer multiple n of the first size; and
a mapping unit for mapping register names for the first instructions, and register names for the second instructions, into a common name space, by
(i) for instructions having sources and destinations of the first size and ach a register of the first size in a named set of registers in the plurality of registers, asserting the valid bit for one of the low portion or the high portion of that named set of registers, and mapping the instruction accordingly, and
(ii) for instructions having sources and destinations of the second size and a register of the second size in the named set of registers, asserting the valid bits for both the low and high portions of that named set of registers, and mapping the instruction accordingly.

20. The system of claim 19 further wherein the processor further comprises:
an execution pipe coupled to the register file,
wherein upon the execution pipe writing a result to only one register in a set of n registers, a valid bit is asserted for only the one register; and
upon the execution pipe writing a result to all registers in the set of n registers, a valid bit for each of the n registers is asserted.

* * * * *

UNITED STATES PATENT AND TRADEMARK OFFICE
CERTIFICATE OF CORRECTION

PATENT NO. : 8,898,436 B2
APPLICATION NO. : 12/426550
DATED : November 25, 2014
INVENTOR(S) : Chaudhry et al.

It is certified that error appears in the above-identified patent and that said Letters Patent is hereby corrected as shown below:

In the Specification

In column 1, line 26, delete "thirty-two thirty-two" and insert -- thirty-two --, therefor.

In column 6, line 36, delete "Similarly;" and insert -- Similarly, --, therefor.

In the Claims

In column 10, line 23, in Claim 19, delete "ach a" and insert -- a --, therefor.

Signed and Sealed this
Eleventh Day of August, 2015

Michelle K. Lee
*Director of the United States Patent and Trademark Office*